(12) United States Patent
McCain

(10) Patent No.: US 7,689,351 B2
(45) Date of Patent: Mar. 30, 2010

(54) VIRTUAL PROFILOGRAPH FOR ROAD SURFACE QUALITY ASSESSMENT

(75) Inventor: Steven Daniel McCain, Tracy, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 1034 days.

(21) Appl. No.: 11/395,815

(22) Filed: Mar. 31, 2006

(65) Prior Publication Data

US 2007/0233327 A1  Oct. 4, 2007

(51) Int. Cl.
*G01C 21/00* (2006.01)

(52) U.S. Cl. .................. 701/207; 701/213; 342/357.01; 342/357.06

(58) Field of Classification Search .................... 701/33, 701/36, 49, 50, 207, 211, 213; 342/357.01, 342/357.06, 357.12
See application file for complete search history.

(56) References Cited

U.S. PATENT DOCUMENTS

| | | |
|---|---|---|
| 4,171,907 A | 10/1979 | Hill et al. |
| 4,697,352 A | 10/1987 | Angove |
| 5,401,115 A | 3/1995 | Musil et al. |
| 5,471,391 A | 11/1995 | Gudat et al. |
| 5,510,889 A | 4/1996 | Herr |
| 5,647,439 A | 7/1997 | Burdick et al. |
| 5,736,939 A | 4/1998 | Corcoran |
| 5,774,374 A | 6/1998 | Scott et al. |
| 5,790,243 A | 8/1998 | Herr |
| 6,035,542 A | 3/2000 | Woznow et al. |
| 6,161,429 A | 12/2000 | Marvel et al. |
| 6,188,942 B1 | 2/2001 | Corcoran et al. |
| 6,218,935 B1 | 4/2001 | Corcoran et al. |
| 6,236,923 B1 | 5/2001 | Corcoran et al. |
| 6,682,261 B1 | 1/2004 | Karamihas et al. |
| 6,741,949 B2 | 5/2004 | Corcoran et al. |
| 2006/0244656 A1 * | 11/2006 | Lawrence et al. ...... 342/357.02 |

FOREIGN PATENT DOCUMENTS

| | | |
|---|---|---|
| EP | 0 997 579 A2 | 5/2000 |
| WO | WO 2006/006246 | 1/2006 |

OTHER PUBLICATIONS

European Patent Office Extended Search Report for Corresponding European Patent Application No. 06026234.2-1236 (7 pages).

* cited by examiner

*Primary Examiner*—Gertrude Arthur Jeanglaud
(74) *Attorney, Agent, or Firm*—Wolff & Samson PC

(57) ABSTRACT

A virtual profilograph is disclosed that can provide measurements indicative of the ride quality of a roadway as the road is being constructed. As a result, a more timely, less costly indication of the ride quality of a roadway is obtained as compared to prior methods. In a first embodiment a Global Navigation Satellite System antenna is attached to a vehicle. When the vehicle travels over a roadway, measurements of the position of the antenna are recorded at different times. A profile of the roadway is created by measuring the elevation of the antenna as a function of the distance traveled from a starting point. In another embodiment, tilt sensors are used to measure the slope of the roadway and the tilt of the vehicle so that a precise orientation of the vehicle and, hence, the contours of the roadway, can be determined.

35 Claims, 4 Drawing Sheets

VIRTUAL PROFILOGRAPH FOR ROAD SURFACE QUALITY ASSESSMENT

BACKGROUND OF THE INVENTION

The present invention relates generally to machines for road paving operations and, more particularly, to assessing the quality of a paved road surface using Global Navigation Satellite Systems.

Methods of designing and paving/surfacing streets, highways and other such roadways, and the equipment used in such paving operations, are extremely well known. For example, in one such method, an asphalt mixture is spread on a properly graded and prepared surface and the mixture is then compacted using, for example, an asphalt compactor. The terms asphalt compactor, roller and roller machine are used interchangeably herein. One skilled in the art will recognize that there are many different types of paving/surfacing operations suitable for different circumstances.

One key assessment of finished roadways is the quality of ride that is experienced by a vehicle as it passes over the roadway. Profilographs, which are well-known in the art, are typically used after construction of a roadway is completed as one method of measuring ride quality. A profilograph is a measurement device that is passed over a roadway to detect the presence and severity of bumps and dips in order to generate a longitudinal profile of the roadway. FIG. 1 shows a prior art profilograph 100 useful for this purpose. Referring to that figure, profilograph 100 has a frame 102 which is, for example, a lightweight aluminum frame. Exemplary profilograph 100 has a length L of 25 feet. Frame 102 is supported above roadway 109 by wheel assemblies 101 and is adapted to be towed behind a vehicle in direction 110. Measurement wheel 108 is attached to arm 107 which, in turn, is attached to mounting box 104 mounted to frame 102 in a way that permits arm 107 and, hence, wheel 108, to move vertically to follow the contour of road 109 as the wheel passes over the road. Measurement wheel and/or arm 107 is connected to recording device 103 via cable 106 and flexible shaft 105. As wheel 108 moves up and down vertically, i.e. over bumps and into dips in a roadway as the profilograph is towed, cable 106 shortens and lengthens, respectively and flexible shaft 105 rotates in relationship to the rotation of wheel 108. Recording device 103 records the variations in the length of cable 106 as a function of the rotation of wheel 108 and compares the vertical position of wheel 108 to the known, fixed position of wheel assemblies 101. Since the number of rotations of wheel 108 are directly proportional to the distance traveled by the profilograph, recording device 103 can accurately record the relative position of wheel 108 with respect to the wheel assemblies 101 in order to determine any fast elevation changes within the length of the profilograph 100 that may function to degrade ride quality. These elevation changes experienced along roadway 109 can then be plotted as a function of the distance from a starting point of the profilograph in order to generate a longitudinal profile of that roadway. Recording device 103 may be an analog device with a physical pen connected to cable 106. In such a case, the pen moves proportionately with the change in length of cable 106 and records the dips and bumps on a roll of paper that is scrolled relative to the pen at a speed proportional to the rotational velocity of wheel 108. Alternatively, recording device 103 may be a digital computing device that records roadway profile information in digital memory. In either case, the result is a profile or graph of a roadway showing any fast elevation changes as a function of distance traveled which can effect the ride quality of a vehicle passing over that roadway.

Other variations on profilographs have also been used. For example, profilographs that are shorter in length have been developed that are useful at higher speeds than the profilograph of FIG. 1, which is limited to relatively slow speeds. Additionally, laser ranging devices have also been used in profilographs, herein referred to as laser profilographs. Laser profilographs typically consist of one or more laser devices attached to a vehicle. The laser is pointed at the roadway as the vehicle moves and one or more sensors measure, for example, the time the light energy emitted from the laser takes to travel from the laser device to the sensor, thus allowing a measurement of the distance from the laser to the ground. The longer the light energy takes to travel from the laser device, be reflected by the road and reach the sensor, the greater the distance above the ground the laser device/sensor are located. The speed of the vehicle is recorded while the distance measurements are taken and this information is transmitted to a computer, which records the information in order to create a profile of the roadway.

BRIEF SUMMARY OF THE INVENTION

While prior profilographs were advantageous in many aspects, they were also limited in certain regards. For example, all prior profilographs required careful calibration prior to operation in order to obtain accurate results. Also, typically, such measurements only took place after a roadway was completed and usually were accomplished by a different crew of workers than the crew that paved the roadway, thus increasing the cost and time associated with completing the construction of a roadway. Additionally, maneuvering such a large mechanical device as a prior profilograph was difficult and unwieldy.

Therefore, the present inventor has recognized there is a need for a more efficient and timely method of measuring the ride quality of a roadway. Accordingly, the present invention is a graphical virtual profilograph that can provide measurements indicative of the ride quality of a roadway as the road is being constructed. As a result, a more timely, less costly indication of the ride quality of a roadway is obtained as compared to prior methods. In one embodiment, a profilograph in accordance with the principles of the present invention allows a road construction crew to alter road construction in real time to improve the ride quality of the road.

In a first embodiment one or more Global Navigation Satellite System antennae are attached to a vehicle. When the vehicle travels over a roadway, measurements of the position of the antenna are recorded at different times. A profile of the roadway is created by measuring the elevation of the antenna as a function of the distance traveled from a starting point. In another embodiment, tilt sensors are used to measure the slope of the roadway and the tilt of the vehicle so that a precise orientation of the vehicle and, hence, the contours of the roadway, can be determined.

These and other advantages of the invention will be apparent to those of ordinary skill in the art by reference to the following detailed description and the accompanying drawings.

DETAILED DESCRIPTION

Figure 2:
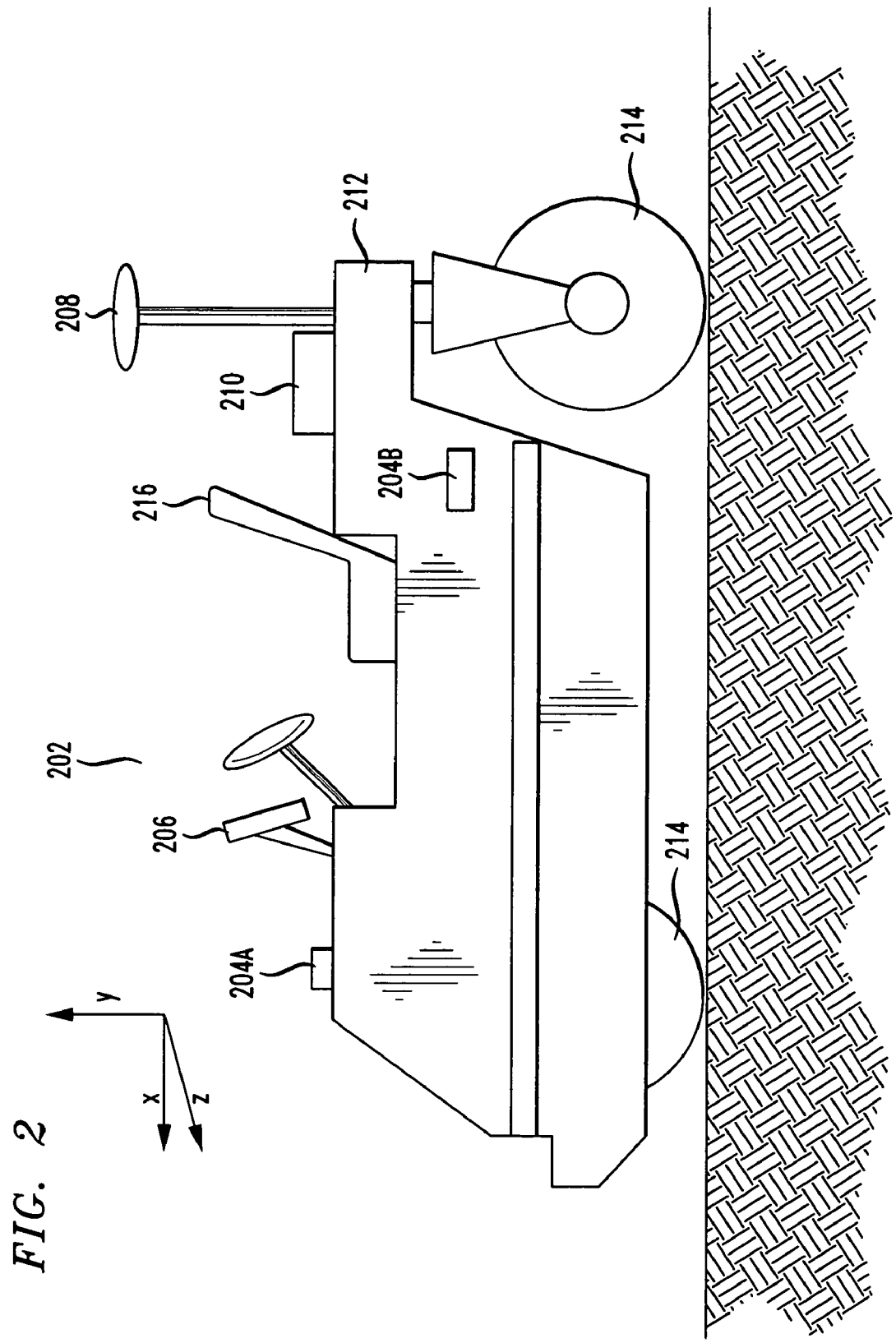
FIG. 2 shows a virtual profilograph system on an asphalt compactor in accordance with an embodiment of the present invention.

FIG. 2 shows a construction machine 202 in accordance with an embodiment of the present invention. Specifically, that figure shows an asphalt compactor, once again also referred to herein interchangeably as a roller, adapted to compact the material used to construct a roadway. In one particular embodiment, the roller 202 has two cylindrical compacting rollers 214 for compacting the road surface as roller 202 moves across the roadway. The configuration of a roller such as roller 202 is well-known in the art and will not be described in further detail herein other than is necessary to understand the principles of the present invention. Roller 202 has, illustratively, a satellite antenna 208 connected to the roller body 212 that is used to receive signals from Global Navigation Satellite Systems (GNSS). GNSS are well known and used to solve a wide variety of positioning/time related tasks. Two well known such systems are the Global Positioning System (GPS) of the United States and the GLObal NAvigation Satellite System (GLONASS) of Russia. For ease of reference, this description will generally refer to the GPS system, but it is to be understood that the present description is equally applicable to GLONASS, combined GPS+GLONASS, or other GNSS systems.

One skilled in the art will recognize that the position of GPS antenna 208 can be located with a high degree of precision. The precision can be further enhanced using differential GPS, or DGPS, which is well known. Such DGPS methods allow the position of antenna 208 to be determined within, for example, 2 cm vertically, along the y-axis in FIG. 2, and within, also by way of example, 1 cm laterally, along the x and z axes in FIG. 2. This precision can be even further enhanced via the use of more recent techniques that provide even more accurate position measurements. For example, some more recent satellite positioning systems incorporate laser transmitters at a stationary location to transmit a signal that is received by a laser receiver on roller 202. Based on the signal characteristics of the signal received by the receiver and the known location of the stationary transmitter, positional measurements of a satellite positioning system can be enhanced such that the position of antenna 208 can be determined within, for example, 5 millimeter accuracy vertically, along the y-axis in FIG. 2, and within, also by way of example, 1 centimeter laterally, along the x and z axes in FIG. 2.

Thus, as one skilled in the art will recognize, the configuration described above allows for the precise measurement of the Cartesian coordinate position of antenna 208 on roller 202 as well as the linear velocity of that antenna. The antenna is mounted rigidly in a stationary position on the body of roller 202. Therefore, the position of any other component of roller 202 that is also mounted stationary with respect to the body of the roller 202 can be located as accurately as that of the antenna via simple geometric calculations. Particularly, knowing the position of antenna 208 permits the precise position of the cylindrical rollers 214 to be known which, when combined with different measurements over time, allows the heading and position of the roller 202 to be determined with corresponding accuracy. In addition to GPS antenna 208, in another embodiment roller 202 also has tilt sensors 204A and 204B, more generally. Tilt sensor 204A may be used, for example, to measure whether roller 202 is traveling horizontally in the X-Z plane or whether it is traveling uphill or downhill with respect to that plane. Tilt sensor 204B, on the other hand, may be used to determine whether roller 202 is tilted about the longitudinal axis of the roller, i.e., whether the roller is rolling to one side or the other with respect to a horizontal X-Z plane.

One skilled in the art will recognize that, instead of tilt sensors 204A and 204B, multiple GPS antennas can be placed on the body of roller 202 to accomplish the same function. For example, if a second antenna is placed on the roller body, but is offset in both the z and x directions with respect to antenna 208, both the tilt and slope orientation of roller 202 can be determined by comparing the relative three-dimensional positions of the two antennas. One skilled in the art will be able to devise various equally advantageous placements and configurations of GNSS antennas in order to determine the positions and orientations of roller 202 and cylindrical rollers 214 as described above. Thus, the precise position, velocity, heading and orientation (e.g., slope and tilt) of roller 202 and its various components, such as rollers 214, can be determined. Therefore, by taking multiple measurements over time as the roller moves across a surface, a precise profile of the roadway can be determined.

Figure 3:
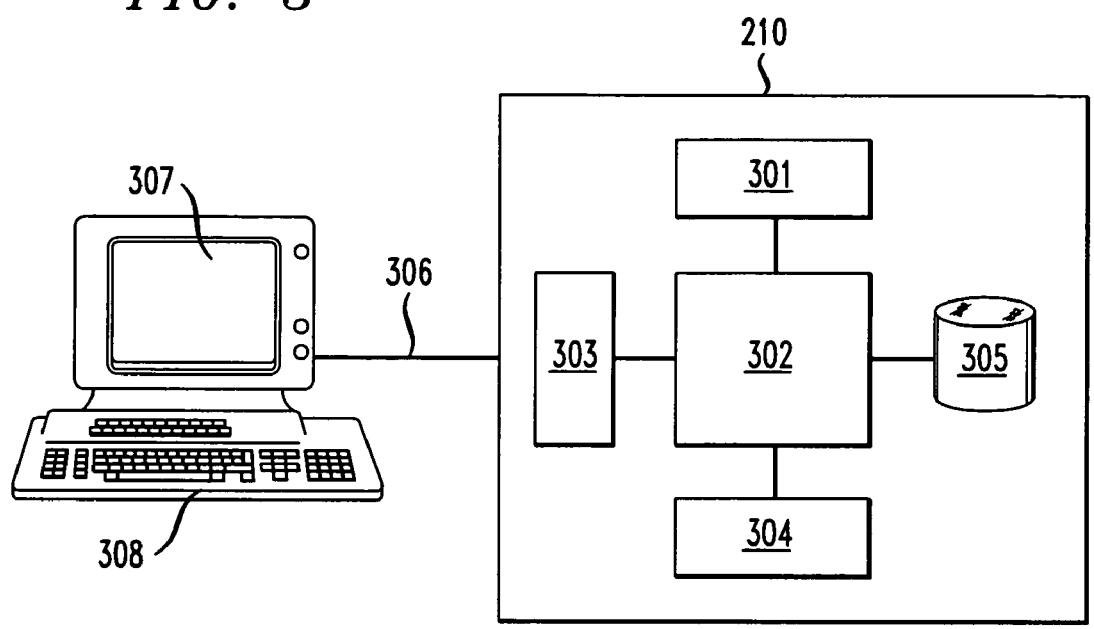
FIG. 3 shows a GPS control system useful in the virtual profilograph system of FIG. 2.

One skilled in the art will also recognize that the antenna 208 of FIG. 2 may be connected to a GNSS control system, such as GPS receiver 210 in FIG. 2, which may be implemented on a programmable computer adapted to perform the steps of a computer program to calculate and display the position of the roller 202 and/or the cylindrical rollers 214 on illustrative terminal 206 in FIG. 2. Referring to FIG. 3, such a control system 210 may be implemented on any suitable computer adapted to receive, store and transmit data such as data associated with the aforementioned antenna location(s). Specifically, illustrative control system 210 may have, for example, a processor 302 (or multiple processors) which controls the overall operation of the control system 210. Such operation is defined by computer program instructions stored in a memory 303 and executed by processor 302. The memory 303 may be any type of computer readable medium, including without limitation electronic, magnetic, or optical media. Further, while one memory unit 303 is shown in FIG. 3, it is to be understood that memory unit 303 could comprise multiple memory units, with such memory units comprising any type of memory. Control system 210 also comprises illustrative modem 301 and network interface 304. Control system 210 also illustratively comprises a storage medium, such as a computer hard disk drive 305 for storing, for example, data and computer programs adapted for use in accordance with the principles of the present invention as described hereinabove. Finally, control system 210 also illustratively comprises one or more input/output devices, represented in FIGS. 2 and 3 as terminal 206, for allowing interaction with, for example, a technician or machine operator. Terminal 206 illustratively has display 307 and input device (here, a keyboard) 308. One skilled in the art will recognize that control system 210 and terminal 206 may be located directly on roller 202 or, for example, may be located remote from roller 202. One skilled in the art will also recognize that control system 210 is merely illustrative in nature and that various hardware and software components may be adapted for equally advantageous use in a computer in accordance with the principles of the present invention.

Figure 4:
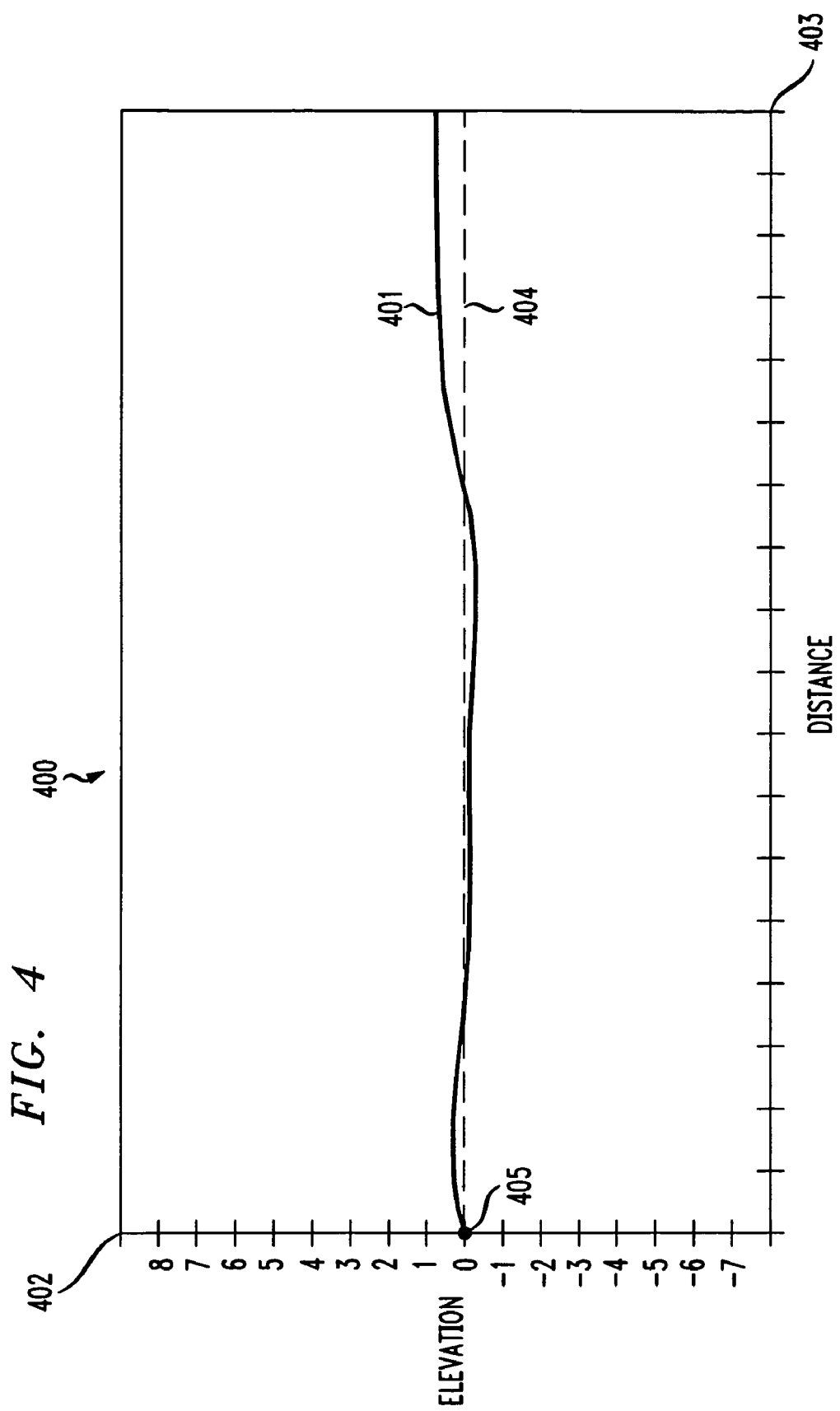
FIG. 4 shows an illustrative display of the virtual profilograph system in accordance with an embodiment of the present invention.

FIG. 4 shows an illustrative graph 400 created by the control system and displayed on a paper graph or, alternatively, on a display, such as display 307 of terminal 206 in FIG. 3. Referring to FIG. 4, graph 400 has vertical axis 402 representing the elevation of the GNSS antenna 208 of FIG. 2 with respect to an initial starting elevation 404. Illustratively, the elevation represented by axis 402 is displayed in centimeters.

Figure 1:
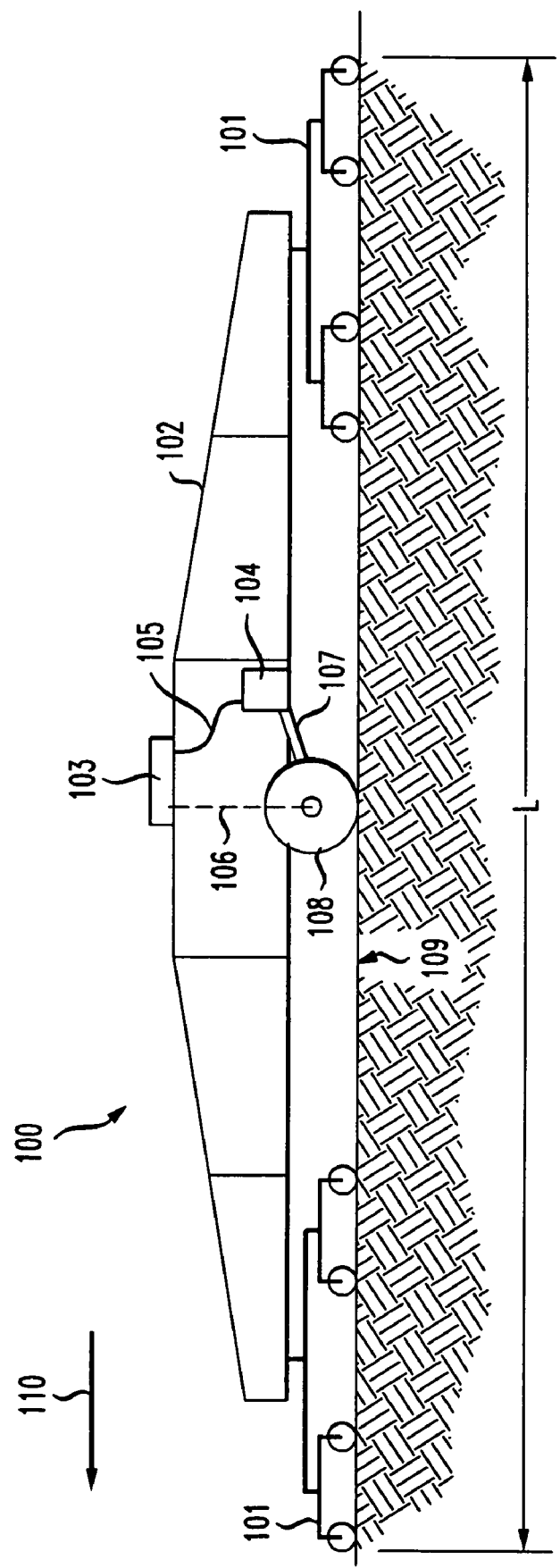
FIG. 1 shows a prior art profilograph.

Graph 400 also has horizontal axis 403 representing the distance traveled from a starting point on a roadway, illustratively shown as starting point 405 in graph 400. The distance represented by axis 403 is, for example, displayed in feet. One skilled in the art will recognize that many different resolutions using different units of measurement for axes 402 and 403 may be used with equally advantageous results depending on road conditions (i.e., the relative roughness or smoothness of the road). One skilled in the art will also recognize that the distances represented by axes 402 and 403 may be expressed in any suitable units or, alternatively, may be a relative unit-less elevation. As roller 202 of FIG. 2 moves across the roadway, vertical and horizontal position measurements taken by the GNSS control system of FIG. 3 and as described above are plotted on graph 400 as a function of the distance traveled by the roller. Alternatively, the raw positional data represented by these vertical and horizontal position measurements may be averaged, for example over various distances, or otherwise mathematically smoothed to simulate the way a mechanical profilograph measures fast elevation changes of wheel 108 in FIG. 1 with respect to wheel assemblies 101, as discussed above. In either case, plot 401 represents the surface of the roadway across which the roller moves and, thus, may be used to assess the ride quality of vehicles traveling across the surface of the roadway.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

The invention claimed is:

1. A method for use with a first vehicle adapted to move across a surface, said first vehicle comprising a Global Navigation Satellite System (GNSS) antenna receiver, said method comprising:
   calculating a plurality of locations of said GNSS antenna at a corresponding plurality of different times;
   storing said plurality of locations;
   generating a representation of said surface based on said plurality of locations and said corresponding plurality of times; and
   determining the ride quality of a second vehicle across said surface as a function of said representation.

2. The method of claim 1 wherein said surface is a roadway.

3. The method of claim 2 wherein said first vehicle is an asphalt compactor adapted to compact the surface of said roadway.

4. The method of claim 1 wherein said representation of said surface is displayed on a computer display.

5. The method of claim 1 further comprising:
   storing said representation of said surface in computer memory.

6. The method of claim 1 wherein said plurality of locations correspond to the different locations of the antenna as the first vehicle moves across said surface.

7. The method of claim 1 wherein said representation comprises a graph of the distance a component of said first vehicle has traveled compared to a starting location as a function of the elevation of said component.

8. The method of claim 7 wherein said component comprises said GNSS antenna.

9. The method of claim 7 wherein said component comprises a roller on said first vehicle.

10. Apparatus for use with a first vehicle adapted to move across a surface, said first vehicle comprising a Global Navigation Satellite System (GNSS) antenna, said apparatus comprising:
    means for calculating a plurality of locations of said GNSS antenna at a corresponding plurality of different times;
    means for storing said plurality of locations of said antenna;
    means for creating a representation of said surface based on said plurality of locations and said corresponding plurality of times; and
    means for determining the ride quality of a second vehicle across said surface as a function of said representation.

11. The apparatus of claim 10 wherein said surface is a roadway.

12. The apparatus of claim 11 wherein said first vehicle is an asphalt compactor adapted to compact the surface of said roadway.

13. The apparatus of claim 10 further comprising:
    a computer memory adapted to store said representation of said surface.

14. The apparatus of claim 10 wherein said plurality of locations correspond to the different locations of the antenna as the first vehicle moves across said surface.

15. The apparatus of claim 10 wherein said means for creating a representation further comprises means for creating a graph of the distance a component of said first vehicle has moved compared to a starting location as a function of the elevation of said component.

16. The apparatus of claim 15 wherein said component comprises said GNSS antenna.

17. The apparatus of claim 15 wherein said component comprises a roller on said first vehicle.

18. A computer readable medium storing computer program instructions which, when executed on a processor, define the steps of:
    calculating a plurality of locations of said GNSS antenna at a corresponding plurality of different times;
    storing said plurality of locations of said antenna;
    creating a representation of said surface by displaying said plurality of locations as a function of said corresponding plurality of times; and
    determining the ride quality of a second vehicle across said surface as a function of said representation.

19. The computer readable medium of claim 18 wherein said surface is a roadway.

20. The computer readable medium of claim 19 wherein said first vehicle is an asphalt compactor adapted to compact the surface of said roadway.

21. The computer readable medium of claim 18 wherein said representation of said surface is displayed on a computer display.

22. The computer readable medium of claim 18 further storing computer program instructions which, when executed on a processor, define the step of:
    storing said representation of said surface in computer memory.

23. The computer readable medium of claim 18 wherein said plurality of locations correspond to the different locations of the antenna as the first vehicle moves across said surface.

24. The computer readable medium of claim 18 wherein said representation comprises a graph of the distance a component of said first vehicle has traveled compared to a starting location as a function of the elevation of said component.

25. The computer readable medium of claim 24 wherein said component comprises said GNSS antenna.

26. The computer readable medium of claim 24 wherein said component comprises a roller on said first vehicle.

27. A virtual profilograph comprising:
- at least a first GNSS antenna/receiver adapted to be attached to a construction vehicle capable of moving on a surface; and
- a processor for determining and storing a plurality of locations of said at least a first GNSS antenna at a corresponding plurality of times, said processor adapted to create a representation of said surface as a function of said plurality of locations and said corresponding plurality of times, said processor adapted to determine the ride quality of a second vehicle across said surface as a function of said representation.

28. The virtual profilograph of claim 27 wherein said surface is a roadway.

29. The virtual profilograph of claim 28 wherein said construction vehicle is an asphalt compactor adapted to compact the surface of said roadway.

30. The virtual profilograph of claim 27 wherein said representation of said surface is displayed on a computer display.

31. The virtual profilograph of claim 27 further comprising:
- storing said representation of said surface in computer memory.

32. The virtual profilograph of claim 27 wherein said plurality of locations correspond to the different locations of the antenna as the construction vehicle moves across said surface.

33. The virtual profilograph of claim 27 wherein said display displays a graph of the distance a component of said construction vehicle compared to a starting location as a function of the elevation of said component.

34. The virtual profilograph of claim 33 wherein said component comprises said GNSS antenna.

35. The virtual profilograph of claim 33 wherein said component comprises a roller on said construction vehicle.

* * * * *